United States Patent

Reiter et al.

[11] Patent Number: 5,900,329
[45] Date of Patent: May 4, 1999

[54] FUEL-CELL SYSTEM AND METHOD FOR OPERATING A FUEL-CELL SYSTEM

[75] Inventors: Kurt Reiter, Erlangen, Germany; Pavel Chmelik, Pilsen, Czechoslovakia; Jürgen Lehmeier, Hanover, Germany

[73] Assignee: Siemens Aktiengesellschaft, Munich, Germany

[21] Appl. No.: 08/843,805

[22] Filed: Apr. 21, 1997

Related U.S. Application Data

[63] Continuation of application No. PCT/DE95/01388, Oct. 6, 1995.

[30] Foreign Application Priority Data

Oct. 19, 1994 [DE] Germany .............................. 44 37 413

[51] Int. Cl.$^6$ .................................................. H01M 8/04
[52] U.S. Cl. .................................. 429/17; 429/26; 429/34
[58] Field of Search ................................. 429/17, 26, 34

[56] References Cited

U.S. PATENT DOCUMENTS

| | | |
|---|---|---|
| 3,976,506 | 8/1976 | Landau . |
| 4,333,992 | 6/1982 | Healy .......................................... 429/17 |
| 4,622,275 | 11/1986 | Noguchi et al. ....................... 429/26 X |
| 5,319,925 | 6/1994 | Hendriks et al. ...................... 429/17 X |
| 5,340,663 | 8/1994 | Buswell et al. ............................ 429/17 |
| 5,417,051 | 5/1995 | Ankersmit et al. .................... 429/17 X |
| 5,554,453 | 9/1996 | Steinfeld et al. ........................... 429/17 |

FOREIGN PATENT DOCUMENTS

| | | |
|---|---|---|
| 0459165A2 | 12/1991 | European Pat. Off. . |
| 4021097A1 | 1/1992 | Germany . |

OTHER PUBLICATIONS

Japanese Patent Abstract No. 63289774 (Toshiaki), dated Mar. 22, 1989.
Japanese Patent Abstract No. 63279576 (Toru), dated Mar. 15, 1989.
Japanese Patent Abstract No. 63152878 (Osao et al.), dated Nov. 2, 1988.
Japanese Patent Abstract No. 61176075 (Narihisa), dated Dec. 23, 1986.
"Hochtemperatur–Brandstoffzelle SOFC —Stand der Forschung für eine neue Technik zur Stromerzeugung", Dr. E. Erdle, VDI Berichte No. 1029, 1993, pp. 249–259 (Month Unknown).

*Primary Examiner*—Stephen Kalafut
*Attorney, Agent, or Firm*—Herbert L. Lerner; Laurence A. Greenberg

[57] ABSTRACT

It is presently customary in a high-temperature fuel-cell system to divide the cathode waste gas, in particular, into two subflows, of which one is recirculated again to the cathode and the other is removed for heat utilization. The bifurcation is carried out at relatively high technical costs at about the operating temperature of the fuel cell at the gas outlets themselves. In order to reduce that cost, the entire cathode waste gas is fed through a heat exchanger to a bifurcation having two branch pipes. The first branch pipe opens through an air addition point and the heat exchanger into the cathode and the second branch pipe opens into a temperature-increasing device. In this way, a bifurcation of the hot cathode waste gas is avoided and the heat of the entire cathode waste gas is used to heat the cathode waste gas subflow fed back into the cathode. The invention can preferably be used, in particular, for fuel cells having operating temperatures above 600° C. Such fuel cells are the molten carbonate fuel cell and the solid electrolyte fuel cell.

17 Claims, 3 Drawing Sheets

FUEL-CELL SYSTEM AND METHOD FOR OPERATING A FUEL-CELL SYSTEM

CROSS-REFERENCE TO RELATED APPLICATION

This application is a Continuation of International Application Ser. No. PCT/DE95/01388, filed Oct. 6, 1995.

BACKGROUND OF THE INVENTION

FIELD OF THE INVENTION

The invention relates to a fuel-cell system, in particular a high-temperature fuel-cell system, including at least one fuel-cell block having an anode section and a cathode section. The invention also relates to a method for operating such a fuel-cell system.

A fuel cell contains an anode and a cathode which are separated by an immediately adjacent, ion-conducting electrolyte. The electrolyte may be composed of an ion-conducting liquid, of a polymer membrane or, as in the case of a high-temperature fuel cell, of a solid body, such as of zirconium oxide containing small additions of yttrium oxide, for example. The electrolyte of a high-temperature fuel cell is oxygen-ion-conducting at operating temperatures of the high-temperature fuel cell of about 1000° C. The fuel, generally hydrogen, is fed to the anode, oxygen or combustion air is fed to the cathode by suitable duct systems and water produced in the reaction of hydrogen and oxygen is discharged from the fuel cell with anode waste gas or cathode waste gas, depending on the type of fuel cell. A fuel cell can convert the fuel into electrical energy with a higher efficiency and lower environmental pollution than is capable of being done by conventional, heretofore-known internal-combustion engines having an efficiency which is limited by the so-called Carnot process.

In development projects that are currently running, attempts are additionally also being made to utilize the heat produced during the operation of fuel cells, in particular during the operation of high-temperature fuel cells. Thus, the development of a high-temperature fuel-cell power station proceeds as a rule from the combination of high-temperature fuel cells with a gas turbine and, optionally, a steam turbine connected downstream of the gas turbine, wherein the high-temperature fuel cell takes over the function of the combustion chamber of the gas turbine.

In particular, in devices disclosed in a paper by Dr. E. Erdle entitled "Hochtemperaturbrennstoffzelle SOFC-Stand der Forschung fur eine neue Technik zur Stromerzeugung" [High-Temperature SOFC Fuel Cell—State Of Research Aimed At A New Technology For Current Generation] in VDI Berichte No. 1029, 1993 and in German Published, Non-Prosecuted Patent Application DE 40 21 097 A1, for operating a high-temperature fuel cell, a bifurcation is provided in each case for the cathode waste gas produced on the cathode side, at which bifurcation a first portion of the cathode waste gas is fed to a combustion chamber and at which bifurcation a second portion of the cathode waste gas is conveyed through a recuperative heat exchanger to the temperature-lowering system and then mixed with an inflow of cooler air. The inflow of cooler air is fed back into the cathode gas spaces together with the cooled subflow of the cathode waste gas through a compressor and the same recuperative heat exchanger. The non-recirculated portion of the cathode waste gas is combusted with the anode waste gas in a burner. The flue gas of that combustion process is normally fed to a gas turbine. That configuration is quite sensible thermodynamically, but has the disadvantage of requiring the cathode waste gas to be bifurcated at about 1000° C. Consequently, a high expenditure is necessary in regard to the pipe system and the connecting and welding procedure.

A further disadvantage of that configuration is that the amount of recirculated cathode waste gas must not exceed a certain proportion because the quantity of heat might otherwise no longer be adequate to preheat the cathode gas to be fed to the fuel cell.

SUMMARY OF THE INVENTION

It is accordingly an object of the invention to provide a fuel-cell system and a method for operating a fuel-cell system, which overcome the hereinafore-mentioned disadvantages of the heretofore-known devices and methods of this general type and in which the problem of removing cathode waste gas and of heat utilization of the cathode waste gas is solved, in a particularly simple manner.

With the foregoing and other objects in view there is provided, in accordance with the invention, a fuel-cell system, in particular a high-temperature fuel-cell system, comprising at least one fuel-cell block having an anode section and having a cathode section producing cathode waste gas; a waste gas pipe starting from the cathode section and carrying all of the cathode waste gas; a heat exchanger through which the waste gas pipe extends; a bifurcation to which the waste gas pipe extends, the bifurcation having first and second branch pipes, the first branch pipe having an air addition point, passing through the heat exchanger and opening into the cathode section, optionally a heat utilization device into which the second branch pipe opens and optionally a temperature-increasing device through which the second branch pipe passes to the heat utilization device.

With the objects of the invention in view there is also provided a method for operating a fuel-cell system, which comprises dividing at least one fuel-cell block into an anode section and a cathode section producing a cathode waste gas; cooling the entire cathode waste gas; dividing the entire cathode waste gas into at least first and second cathode waste gas subflows; supplementing the first cathode waste gas subflow with air; heating the first cathode waste gas subflow; feeding the first cathode waste gas subflow into the cathode section of the fuel-cell block; and preferably utilizing heat of the second cathode waste gas subflow.

In this way it is possible to avoid a bifurcation of the hot cathode waste gas from the cathode gas spaces. At the same time, the heat removed from the cathode waste gas in the heat exchanger is fed back again to the gas mixture flowing into the cathode gas spaces. A reduction in temperature, which has a beneficial effect on the specification of a compressor, is achieved by feeding in fresh air and an increase in the oxygen content of the gas mixture entering the cathode gas spaces. In order to explain what is meant by feeding through a heat exchanger to a bifurcation, it may be noted that a splitting-up of the cathode waste gas into at least two subflows can also already be provided in or at the heat exchanger in the case of a suitably low cathode waste gas temperature.

This configuration furthermore ensures that the quantity of heat available in the heat exchanger for preheating the cathode gas to be fed into the fuel cell is adequate for all of the cathode waste gas divisions.

In accordance with another feature of the invention, there is provided a circulating fan disposed in the first branch pipe between the heat exchanger and the air addition point.

In accordance with still another feature of the invention, there is provided a compressor disposed between the heat exchanger and the air addition point. The temperature of the cathode waste gas subflow is reduced because of the addition of air, with the result that an inexpensive air compressor of particularly simple construction, in particular an induced draught fan, can be used.

In accordance with a further, alternative, feature of the invention, proceeding from the bifurcation in the first branch pipe, in sequence, a first further heat exchanger and a compressor are disposed upstream of the air addition point, and the air is fed through the first further heat exchanger to the addition point. In this case, the temperature of the cathode waste gas subflow is reduced by the first further heat exchanger, so that a compressor mentioned above can again be provided. The air fed to the addition point is heated by the heat removed from the cathode waste gas subflow and can be fed to the cathode waste gas subflow upstream of the heat exchanger.

In accordance with an added feature of the invention, the temperature-increasing device is a second further heat exchanger, the second branch pipe is routed further from the second further heat exchanger into the inlet of a turbine and a flue gas pipe opens into the outlet of the turbine through the second further heat exchanger. In this way, it is possible to deliver heat supplied through the flue gas pipe to the second cathode waste gas subflow. Additionally, in this way, a gas mixture is injected into the turbine inlet at a relatively high flowrate and relatively high temperature, with the result that, when the hot gas mixture, which is still under pressure at the cathode outlet, is expanded, particularly high power efficiency is achieved in the gas turbine.

In accordance with an additional feature of the invention, the temperature-increasing device is alternatively a combustion chamber to which there is connected on the inlet side, in addition to the second branch pipe, a feed pipe for a gas mixture originating from the anode section of the fuel-cell block and an air feed pipe, and, on the outlet side, a pipe connected to the inlet of the turbine. In this way, the second cathode waste gas subflow is heated through the use of the combustion of a suitable gas mixture, in this case the waste gas and air originating from the anode section, which manifests itself in a relatively high inlet temperature at the turbine. A gas mixture originating from the anode section of the fuel-cell block is understood as meaning, inter alia, the anode waste gas itself, but also an anode waste gas additionally reduced by fuel (hydrogen) or even an anode waste gas, a so-called anode residual gas, additionally reduced by fuel and carbon dioxide.

In addition, it is conceivable to combust a combustible gas mixture, which may additionally be available, together with the anode waste gas. Such a gas mixture may be produced, for example, in the case of fuel reforming or coal gasification.

In accordance with yet another feature of the invention, the heat utilization device is a turbine having an inlet; the temperature-increasing device is a combustion chamber having an inlet side and an outlet side; the second branch pipe, a feed pipe starting from the anode section for carrying a gas mixture and an air feed pipe are connected to the inlet side of the combustion chamber; and a pipe is connected from the outlet side of the combustion chamber to the inlet of the turbine.

In accordance with yet a further feature of the invention, there is provided a shaft connecting the compressor to the turbine.

In accordance with yet an added feature of the invention, there is provided a generator connected to the turbine by the shaft.

In accordance with yet an additional feature of the invention, there is provided another compressor for the gas mixture from the anode section, the shaft connecting the other compressor to the turbine.

In accordance with another mode of the invention, there is provided a method which comprises compressing the first cathode waste gas subflow prior to the heating step.

In accordance with a further mode of the invention, there is provided a method which comprises cooling and compressing the first cathode waste gas subflow prior to supplementing with air, and utilizing heat energy extracted during the cooling step for air preheating.

In accordance with a concomitant mode of the invention, there is provided a method which comprises expanding the second cathode waste gas subflow in a turbine, preferably after cooling.

Other features which are considered as characteristic for the invention are set forth in the appended claims.

Although the invention is illustrated and described herein as embodied in a fuel-cell system and a method for operating a fuel-cell system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
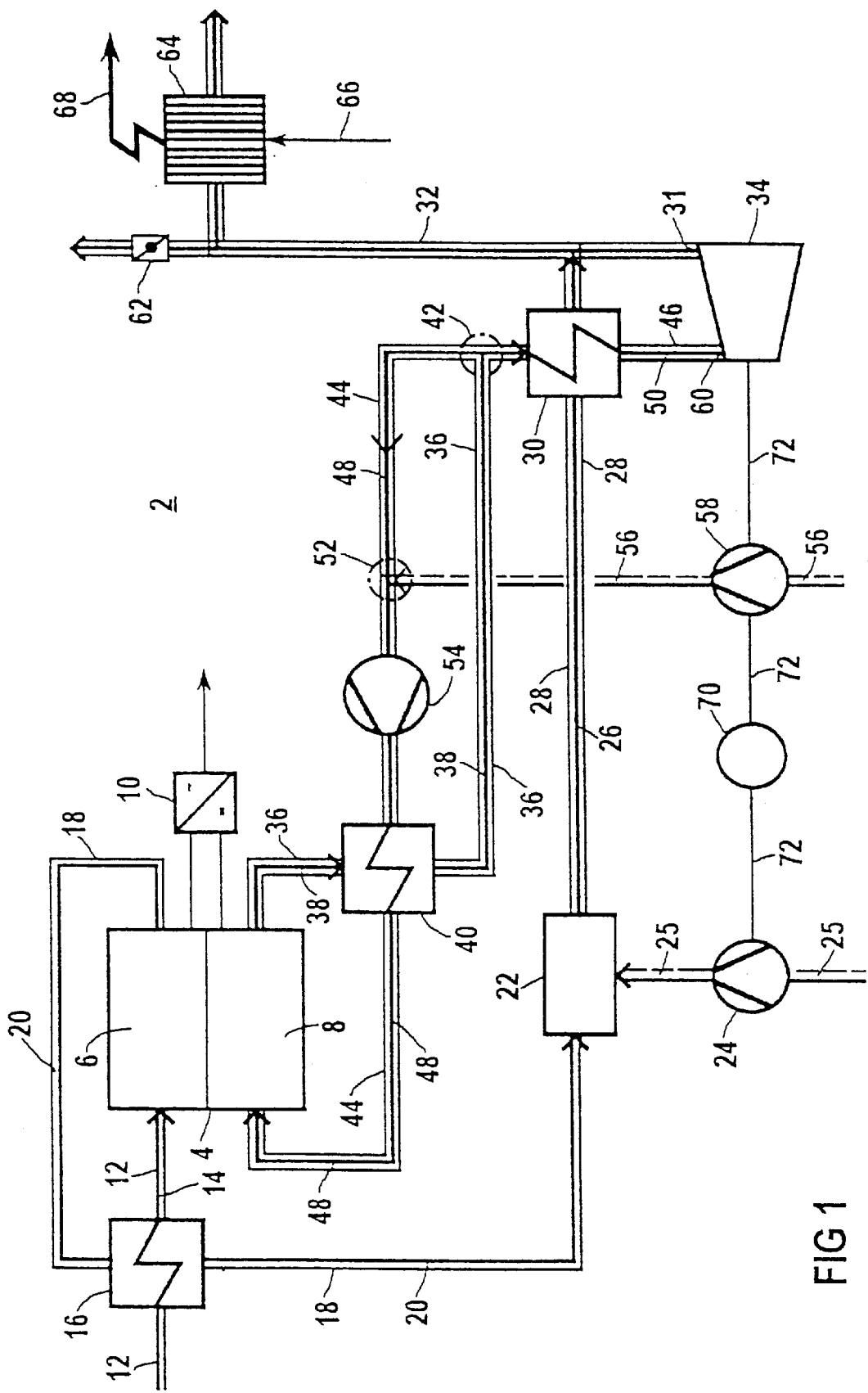
FIG. 1 is a schematic and block circuit diagram of a high-temperature fuel-cell system with a downstream gas turbine.

Referring now in detail to the figures of the drawings, in which identical parts have identical reference symbols, and first, particularly, to FIG. 1 thereof, there is seen a diagrammatic representation of a high-temperature fuel-cell system 2 having a high-temperature fuel-cell block 4 that is divided into an anode section 6 having anode gas spaces which are not shown further, and a cathode section 8, having cathode gas spaces which are not shown further. In the exemplary embodiment, the high-temperature fuel-cell block 4 is made up of a multiplicity of planarly constructed non-illustrated high-temperature fuel cells, and has an electrical power of 40 megawatts. A power inverter 10 which is connected to the fuel-cell block 4 converts direct current generated by the fuel-cell block 4 into alternating current for a non-illustrated power network.

A steam-containing, hydrogen-containing and/or carbon-monoxide-containing fuel gas 14, which is heated beforehand to about 900° C. in an anode-side recuperative heat exchanger 16, is fed to the anode section 6 through a fuel feed pipe 12. A hydrogen-depleted and/or carbon-monoxide-depleted anode waste gas or offgas 20 at a temperature of about 1000° C. is discharged from the anode section 6 through an anode waste gas pipe 18. The anode waste gas 20 flows through the recuperative heat exchanger 16 and gives up most of its heat therein to the fuel gas 14 flowing into the anode section 6. In the exemplary embodiment, the anode waste gas 20 is fed directly to a combustion chamber 22, in which residual hydrogen contained in the anode waste gas 20 is combusted with air supplied through a compressor 24, which is disposed in an air feed pipe 25.

Flue gas 26 produced in the combustion chamber 22 is fed through a flue gas pipe 28 to a temperature-increasing device in the form of a first further heat exchanger 30, in which heat is removed from the flue gas 26. Downstream of the first further heat exchanger 30, the flue gas pipe 28 opens into a turbine outlet pipe 32 connected to a turbine outlet 31. Upon entering the turbine outlet pipe 32, the flue gas 28 is therefore at about the temperature of gas leaving a heat utilization device in the form of a turbine 34.

A cathode waste gas pipe 36 is connected to the cathode section 8 on the outlet side for feeding a cathode waste gas 38 at about 1000° C. through a cathode-side recuperative heat exchanger 40 to a bifurcation 42. Respective first and second cathode waste gas branch pipes 44 and 46 proceed from the bifurcation 42 for respective first and second cathode waste gas subflows 48 and 50. The first cathode waste gas branch pipe 44 is fed from the bifurcation through an air addition point 52, a circulating fan 54 and the heat exchanger 40, into the non-illustrated cathode gas spaces of the cathode section 8. Comparatively cool air is fed to the air addition point 52 through an air feed pipe 56 and a compressor 58 disposed therein. This results in a temperature reduction in the air-enriched first cathode waste gas subflow 48. The circulating fan 54 can therefore be operated at operating temperatures below 600° C., which advantageously affects the cost and the construction of the circulating fan 54. The first cathode waste gas subflow 48 forms about 50 to 90% and preferably about 60 to 80%, of the cathode waste gas 38 supplied to the bifurcation 42. In the heat exchanger 40, the first cathode waste gas subflow 48 is heated to about 850 to 900° C. through the use of the heat given up by the cathode waste gas 38.

A portion of the cathode waste gas 38 left over at the bifurcation 42 is fed as the second cathode waste gas subflow 50 through the heat exchanger 30 to an inlet 60 of the turbine 34. The second cathode waste gas subflow 50 is heated through the use of the heat given up by the flue gas 26 in the heat exchanger 30, to a particularly high turbine inlet temperature in order to achieve as high an output as possible during an expansion of the second cathode waste gas subflow 50 in the turbine 34. A gas mixture discharging from the turbine 34 can escape into the open air through a throttle valve 62 if the valve 62 is in an open position. Alternatively, if the valve position is completely closed or slightly throttled, the gas mixture can be fed into a steam generator 64 and from there into the open air. The steam generator 64, which is supplied with water 66, supplies process steam 68, which can be utilized in a non-illustrated steam turbine. Some of the process steam 68 may also be injected into the fuel gas 14, where it serves to reform a carbon-containing fuel gas. Given a steam excess in the fuel gas, soot formation, which normally occurs in the reforming of natural gas to form hydrogen and ethane, can largely be avoided.

It should be repeated yet again that the process explained above is notable for four particular advantages. Firstly, the hot cathode waste gas 38 discharging from the cathode section 8 is first bifurcated in the cathode-side heat exchanger 40 after it has been cooled. Secondly, the air addition point 52 is disposed upstream of the circulating fan 54 in the flow direction of the first cathode waste gas subflow 48, with the result that the temperature of the first cathode waste gas subflow 48 flowing into the circulating fan 54 is substantially reduced by the addition of the comparatively cool, compressed air. Thirdly, the temperature of the second cathode waste gas subflow 50 is raised considerably in the first further heat exchanger 30 as a result of the utilization of the heat content of the flue gas 26, which corresponds at the same time to a higher gas inlet temperature at the inlet 60 of the turbine 34. Fourthly, an adequate preheating of the cathode waste gas subflow 48 is always ensured, regardless of the division of the cathode waste gas 38 at the bifurcation 42.

The drive power or output generated through the use of the turbine 34 is utilized in the exemplary embodiment to drive the air compressor 58, a generator 70 and the air compressor 24. The above-mentioned components are disposed on a common shaft 72. In this connection, the generator can advantageously also be operated as a motor for starting up the turbine 34.

Figure 2:
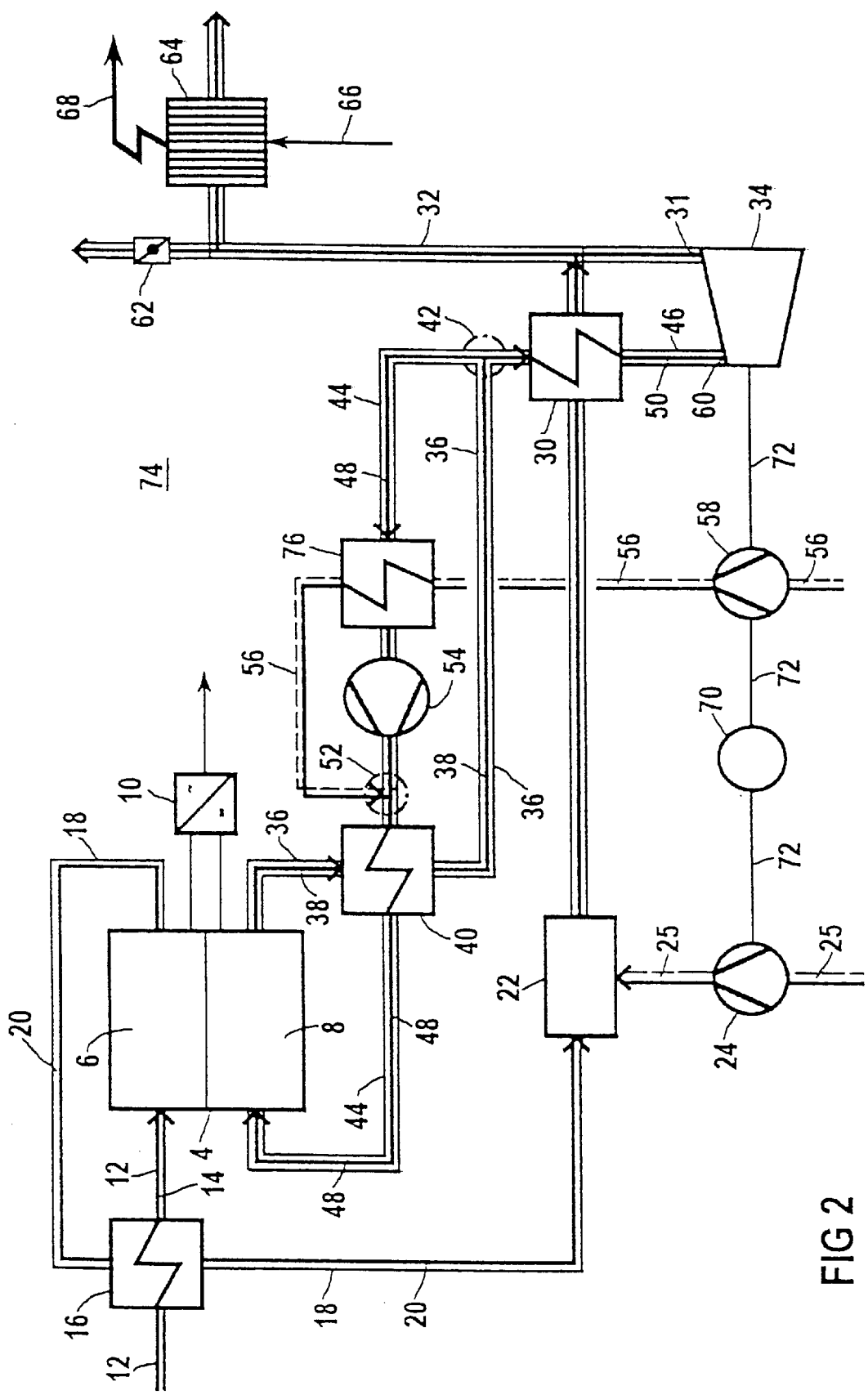
FIG. 2 is a view similar to FIG. 1 of a fuel-cell system that is modified with respect to FIG. 1.

FIG. 2 shows a fuel-cell system 74 which is slightly modified as compared with FIG. 1. The fuel-cell system 74 differs from the system shown in FIG. 1 solely in a modification of the fresh-air feed to the addition point 52 in the first cathode waste gas subflow 48. As seen in the flow direction of the first cathode waste gas subflow 48 after the bifurcation 42, a second further heat exchanger 76, then the circulating fan 54 and then the addition point 52, are disposed in the branch pipe 44. The air supplied through the use of the air compressor 58 is heated in the second further heat exchanger 76, which results in the intended and advantageous temperature reduction of the first cathode waste gas subflow 48. In this exemplary embodiment as well, the circulating fan 54 therefore has to pump the first cathode waste gas subflow 48, which is at a comparatively low temperature. The air which is then fed to the addition point 52 and is already heated, flows from that point together with the first cathode waste gas subflow 48 to the cathode-side heat exchanger 40.

Figure 3:
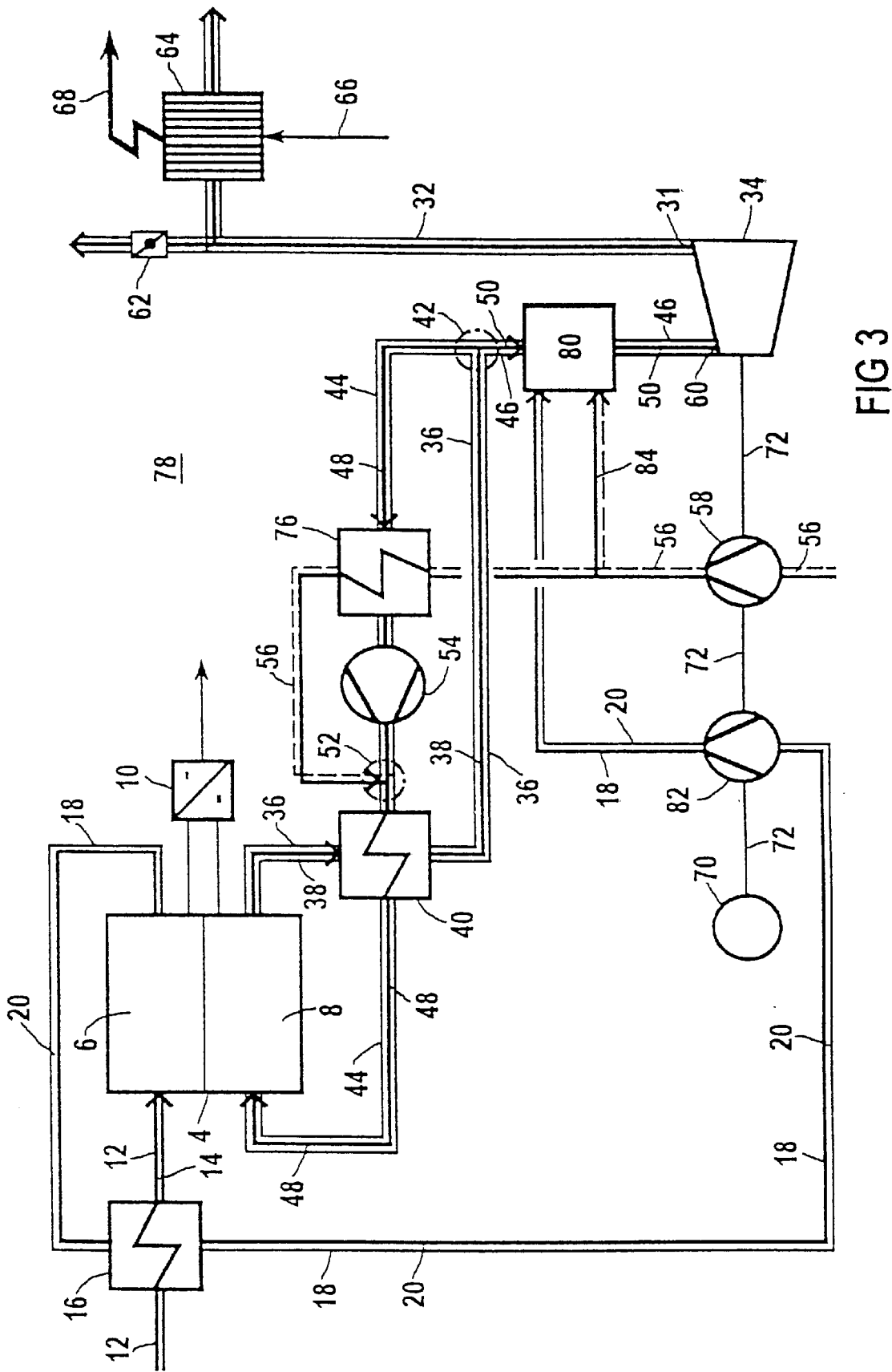
FIG. 3 is a view similar to FIGS. 1 and 2 of a further high-temperature fuel-cell system that is slightly modified with respect to FIG. 2.

FIG. 3 shows a fuel-cell system 78 which is modified with respect to FIG. 2. The modifications relate in this case to the second cathode waste gas subflow 50 as well as to the feed of the anode waste gas 20. Proceeding from the bifurcation 42, the second branch pipe 46 for the second cathode waste gas subflow 50 is fed through a temperature-increasing device in the form of a combustion chamber 80 to the inlet 60 of the turbine 34. The anode waste gas pipe 18 is fed through an anode waste gas compressor 82 into the combustion chamber 80. In addition, a branch pipe 84 which branches off from the air feed pipe 46 also opens into the combustion chamber 80. In the exemplary embodiment, the combustion chamber 80 serves as a temperature-increasing device. The heat liberated during the combustion of the anode waste gas 20 with the air and the second cathode waste gas subflow 50, results in the second cathode waste gas subflow 50, which flows into the inlet 60 of the turbine 34, having a comparatively high inlet temperature and a comparatively high mass flow, which has an advantageous effect on the output achievable with the turbine 34. At the same time, the waste gas mass flow, and consequently also the waste gas losses, can be reduced with respect to the configuration according to FIG. 2. The compressor 82, which brings the anode waste gas 20 to the pressure of the cathode waste gas flow 38, is driven in the exemplary embodiment through the use of the shaft 72 of the turbine 34.

In a non-illustrated alternative, the anode waste gas 20 can be additionally subjected to a gas separation upstream of the compression in the compressor 82. In the gas separation, inert constituents in the anode waste gas 20, in particular carbon dioxide, can be removed. Although this results, on one hand, in the reduction in the mass flow of the anode waste gas 20, it results, on the other hand, in an increase in the temperature in the combustion chamber 80 because inert gas constituents, such as, for example, carbon dioxide, no longer have to be heated in the combustion chamber 80.

We claim:

1. A fuel-cell system, comprising:
   at least one fuel-cell block having an anode section and having a cathode section producing cathode waste gas;
   a waste gas pipe starting from said cathode section and carrying all of the cathode waste gas;
   a heat exchanger through which said waste gas pipe extends; and
   a bifurcation to which said waste gas pipe extends, said bifurcation having first and second branch pipes, said first branch pipe having an air addition point, passing through said heat exchanger and opening into said cathode section, said first branch pipe also having a further heat exchanger and a circulating fan downstream of said further heat exchanger, between said bifurcation and said air addition point, and said air addition point receives air through said further heat exchanger.

2. The fuel-cell system according to claim 1, including a heat utilization device into which said second branch pipe opens.

3. The fuel-cell system according to claim 2, including a temperature-increasing device through which said second branch pipe passes to said heat utilization device.

4. The fuel-cell system according to claim 3, wherein said heat utilization device is a turbine having an inlet; said temperature-increasing device is a combustion chamber having an inlet side and an outlet side; said second branch pipe, a feed pipe starting from said anode section for carrying a gas mixture and an air feed pipe are connected to said inlet side of said combustion chamber; and a pipe is connected from said outlet side of said combustion chamber to said inlet of said turbine.

5. The fuel-cell system according to claim 4, including a compressor for air feed, and a shaft connecting said compressor to said turbine.

6. The fuel-cell system according to claim 5, including a generator connected to said turbine by said shaft.

7. The fuel-cell system according to claim 6, including another compressor for the gas mixture from said anode section, said shaft connecting said other compressor to said turbine.

8. The fuel-cell system according to claim 5, including another compressor for the gas mixture from said anode section, said shaft connecting said other compressor to said turbine.

9. A fuel-cell system, comprising:
   at least one fuel-cell block having an anode section and having a cathode section producing cathode waste gas;
   a waste gas pipe starting from said cathode section and carrying all of the cathode waste gas;
   a heat exchanger through which said waste gas pipe extends;
   a bifurcation to which said waste gas pipe extends, said bifurcation having first and second branch pipes, said first branch pipe having an air addition point, passing through said heat exchanger and opening into said cathode section; and
   a temperature-increasing device through which said second branch pipe passes to said heat utilization device, said temperature-increasing device is a further heat exchanger, said heat utilization device is a turbine having an inlet and an outlet, said second branch pipe is routed from said further heat exchanger into said inlet of said turbine, and a flue gas pipe extends through said further heat exchanger and opens into said outlet of said turbine.

10. The fuel-cell system according to claim 9, including a combustion chamber having an inlet side, a feed pipe starting from said anode section and carrying a gas mixture to said inlet side of said combustion chamber, and an air feed pipe leading to said inlet side of said combustion chamber, said flue gas pipe starting from said combustion chamber.

11. The fuel-cell system according to claim 9, including a compressor for air feed, and a shaft connecting said compressor to said turbine.

12. The fuel-cell system according to claim 11, including a generator connected to said turbine by said shaft.

13. A method for operating a fuel-cell system, which comprises:
   dividing at least one fuel-cell block into an anode section and a cathode section producing a cathode waste gas;
   cooling the entire cathode waste gas;
   dividing the entire cathode waste gas into at least first and second cathode waste gas subflows;
   supplementing the first cathode waste gas subflow with air;
   compressing the first cathode waste gas subflow;
   heating the first cathode waste gas subflow; and
   feeding the first cathode waste gas subflow into the cathode section of the fuel-cell block.

14. The method according to claim 13, which comprises utilizing heat of the second cathode waste gas subflow.

15. The method according to claim 13, which comprises expanding the second cathode waste gas subflow in a turbine.

16. The method according to claim 13, which comprises expanding the second cathode waste gas subflow in a turbine, after heating.

17. A method for operating a fuel-cell system, which comprises:
   dividing at least one fuel-cell block into an anode section and a cathode section producing a cathode waste gas;
   cooling the entire cathode waste gas;
   dividing the entire cathode waste gas into at least first and second cathode waste gas subflows;
   cooling and compressing the first cathode waste gas subflow, and utilizing heat energy extracted during the cooling step for air preheating;
   supplementing the first cathode waste gas subflow with air;
   heating the first cathode waste gas subflow; and
   feeding the first cathode waste gas subflow into the cathode section of the fuel-cell block.

* * * * *

UNITED STATES PATENT AND TRADEMARK OFFICE
CERTIFICATE OF CORRECTION

PATENT NO.   : 5,900,329
DATED        : May 4, 1999
INVENTOR(S)  : Kurt Reiter et al.

It is certified that error appears in the above-indentified patent and that said Letters Patent is hereby corrected as shown below:

On the title page,

Item [30] should read as follows:

Oct. 19, 1994  [DE]    Germany ..... 44 37 413.5

Item [75] should read as follows:

Kurt Reiter, Erlangen, Germany
Pavel Chmelik, Pilsen, Czech Republic
Jürgen Lehmeier, Hannover, Germany Signed and Sealed this Twelfth Day of October, 1999

*Attest:*

Q. TODD DICKINSON

*Attesting Officer*    *Acting Commissioner of Patents and Trademarks*